United States Patent [19]

De Giacomi

[11] Patent Number: 5,044,741
[45] Date of Patent: Sep. 3, 1991

[54] EYEGLASSES WITH INTEGRAL REAR VIEW MIRROR

[76] Inventor: Giancarlo De Giacomi, Via A. Sforza, 47 - Milano, Italy

[21] Appl. No.: 482,113

[22] Filed: Feb. 20, 1990

[30] Foreign Application Priority Data

Feb. 21, 1989 [IT] Italy .............................. 20615/89[U]

[51] Int. Cl.⁵ .......................... G02C 7/14; G02C 9/04
[52] U.S. Cl. .................................................... 351/50
[58] Field of Search .................. 351/50, 158; 350/638

[56] References Cited

U.S. PATENT DOCUMENTS 4,349,246  9/1982  Binner .................................. 351/50

Primary Examiner—Rodney B. Bovernick
Attorney, Agent, or Firm—Browdy and Neimark

[57] ABSTRACT

Eyeglasses with rear view capability wherein the external portion of at least one lens and/or of the rim is replaced by a rear view mirror part which is pivotally coupled to the lens and/or the rim and has the same shape and dimension of the replaced portion of the lens and/or the rim. Preferably the rear view mirror parts are placed above the horizon line of the view of the user who can adjust the position of the rear view mirror parts by hand according to any desired inclination.

14 Claims, 2 Drawing Sheets

EYEGLASSES WITH INTEGRAL REAR VIEW MIRROR

BACKGROUND OF THE INVENTION

The present invention relates to eyeglasses and in particular to eyeglasses wherein at least one lens is provided with an integral adjustable rear view mirror.

It is known that many people, even if they do not need eyeglasses, need a rear view capability for their professional activities. This is for instance the case of security guards, sentries, detectives and so on. The need of rear view capability has been recently expanding also to people practicing sports such as bicycling, jogging and skiing, who need practicing the sport in a safer way without turning the head about for rear view. Also people having a reduced capability to move their head, such as elderly or ill persons, make use of eyeglasses with rear view capability.

DESCRIPTION OF THE PRIOR ART

Some of the eyeglasses with rear view capability already known in the art are provided with integral rear view mirrors which cannot be adjusted, as in the Brazilian Pat. application No. 8600215, so that they have the main disadvantage of a reduced or limited visual field for the user. Eyeglasses with adjustable rear view mirrors are also known in the prior art such as U.S. Pat. No. 4,798,454, U.S. Pat. No. 4,603,944 and U.S. Pat. No. 3,988,058, where the adjustable rear view mirrors are supported by an arm, a clip attachment or similar means which extend beyond the rim or the profile of the glass lens. This kind of known eyeglasses have the disadvantage to be cumbersome, complicated in the use and very often with a strikingly unpleasant appearance.

SUMMARY OF THE INVENTION

The main object of the present invention is to provide eyeglasses with rear view capability which are provided with at least one rear view mirror which is adjustable and does not protrude outside the rim or the profile of the glass lens.

The above and other objects are achieved with the present invention with eyeglasses wherein a lateral portion of at least one lens and/or rim is replaced by a rear view mirror having the same shape and dimension of the replaced portion and is attached thereto in an adjustable way. According to a preferred embodiment of the present invention the external portion of the lens and/or rim replaced by the rear view mirror is in the upper part thereof and according to the most preferred embodiment the said portion is immediately above the horizon line of the user's eyes.

In another embodiment of the Invention the external portion of at least one lens or rim is replaced by a rear view mirror.

The eyeglasses according to the present invention have the advantage that each rear view mirror part replaces a corresponding portion of the lens and/or rim so that they are very close to the eyes of the user whose rear visual field is accordingly relatively wide. Another advantage of the eyeglasses according to the present invention is that the rear view mirrors have the same shape and dimension of the replaced portions of the lenses and/or rim so that they are not cumbersome and can even pass unnoticed to a common observer.

The above and other advantages of the eyeglasses according to the present invention shall appear evident to those skilled in the art from the following detailed description of some embodiments thereof with reference to the attached drawings wherein:

DESCRIPTION OF THE PREFERRED EMBODIMENT(S)

Figure 1:
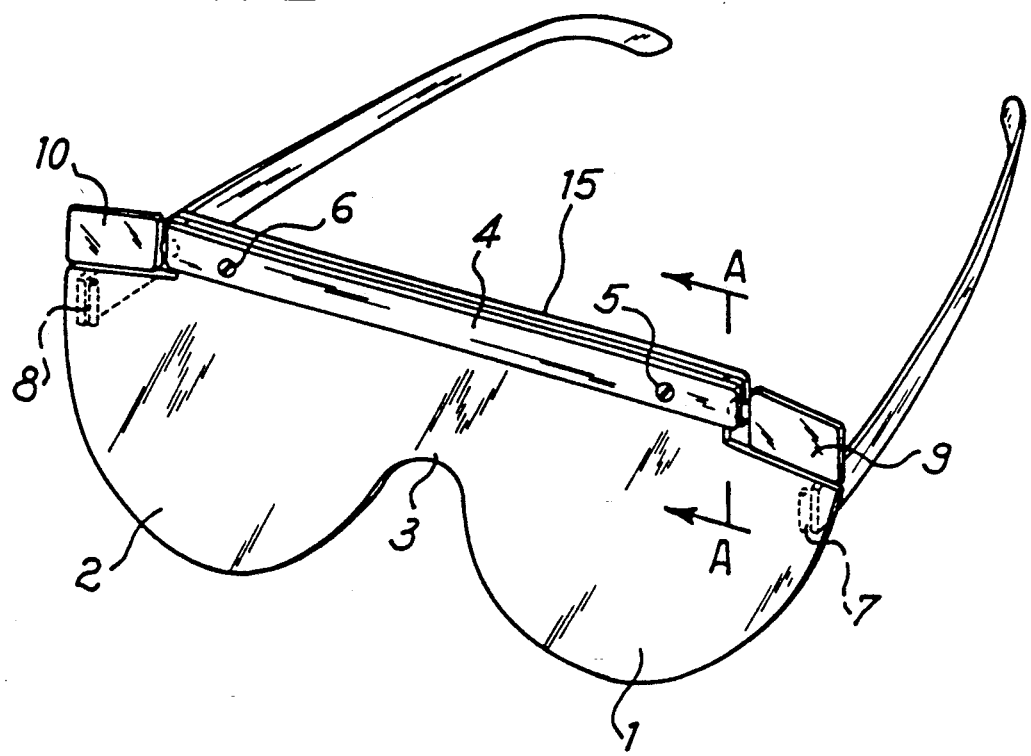
FIG. 1 is a perspective view of a pair of eyeglasses according to the present invention.

Referring now to FIG. 1 it can been seen that in one of the preferred embodiments of the present invention the structure of the eyeglasses is of the kind usually called sport mask. In this kind of rimless eyeglasses, mainly used as a sunglasses, the lenses 1 and 2 as well as the bridge 3 are made of the same optical material and the structure is in a single piece. This single piece is commonly attached to a front band 4 by means of screws 5 and 6. The external end of each lens is provided with hinges 7 or 8 connecting the said lens to the relevant bow or side.

According to the present invention, the external upper portions of the lenses 1 and 2 are replaced by the rear view mirrors 9 and 10 respectively. These rear view mirrors 9 and 10 have the same shape and dimension of the replaced portions of the lenses 1 and 2 and have preferably the same color thereof. The only difference is that the back surface of each portion y and 10 is structured as a rear view mirror.

The portions 9 and 10 are pivotally coupled to the lenses 1 and 2 respectively so that their position can be adjusted according to any desired inclination. This adjustment which can be performed simply by hand, is very important for adapting the mirror portions 9 and 10 to the eyes of the user. To this purpose any kind of pivotable joint can be used.

Figure 2:
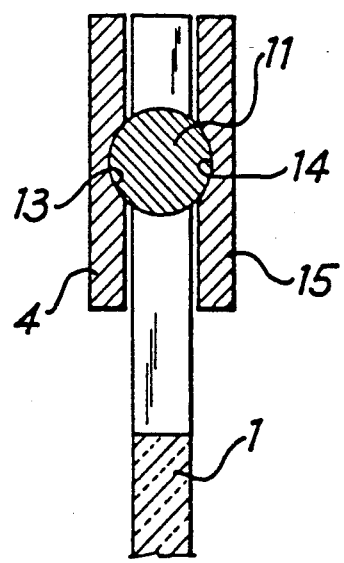
FIG. 2 is an enlarged section view taken along the line A-A' of FIG. 1 and shows the ball and socket joint coupling the rear view mirror to the lens.

In FIG. 2 it can be seen one of the most simple suitable joints which can be used for pivotally coupling the mirror portions 9 and 10 to the lenses 1 and 2 respectively. This kind of joint is commonly known as ball joint or socket and ball joint. It essentially comprises a ball 11 which is solid with the mirror portion 10 and is rotatably housed in a socket formed by two dome-shaped recesses 13 and 14 in the internal surface of the front bar 4 and of the backing bar 15 respectively. The pressure of the front bar and the backing bar on the ball 11 can be adjusted by means of the screws 5 and 6.

Figure 3:
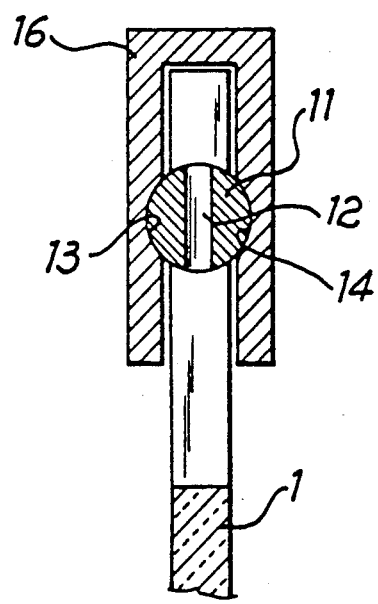
FIG. 3 shows an alternative embodiment of the joint coupling the rear view mirror to the lens.

FIG. 3 shows an alternative embodiment of the ball joint which can be used according to the present invention. This alternative joint is to be preferred when the front bar and the backing bar are structured in one single piece having an inverted U section indicated with 16 in the figure. This structure has a reduced elasticity with respect to the one illustrated in FIG. 1 so that the ball 11 is to be provided with more elasticity. This is obtained by providing the ball 11 with a slit 12 which allows the ball 11 to be housed between the dome-shaped recesses 13 and 14 in compressed condition.

Figure 4:
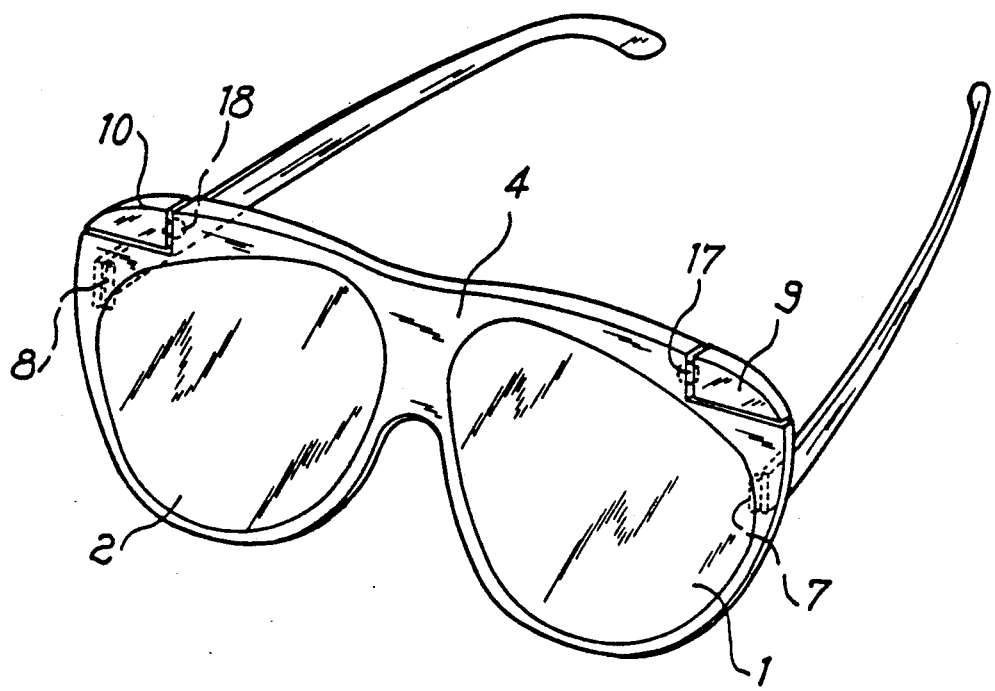
FIG. 4 shows a perspective view of an another embodiment of the invention.

FIG. 4 shows a perspective view of another embodiment of the present invention. In this case the eyeglasses have a more traditional shape with the lenses 1 and 2 inserted in the rim 4. As usual the rim 4 is coupled to the bows by means of hinges 7 and 8 respectively. The external upper parts of the rim 4 are replaced according to the present invention by the rear view mirrors 9 and 10 which are pivotally coupled to rim 4 by means of the ball joints 17 and 18. The edges of the mirror parts 9 and 10 are very close to the corresponding edge of the rim 4, but there is enough room allowing the adjustment of the parts 9 and 10 according to both the vertical and horizontal axis. The colour of the mirror parts 9 and 10 is preferably similar to the one of the rim 4.

In the embodiment according to FIG. 4 the mirror parts 9 and 10 replace corresponding portions of the rim 4. It is to be noticed that according to the present invention, the inner and lower edge of each mirror part 9 and 10 can also extend beyond the border of the rim 4 and penetrate the lenses 1 or 2. In such a case the mirror parts 9 and 10 replace a portion of the rim 4 as well as a portion of lenses 1 or 2 so that it is preferable that the front surfaces of parts 9 and 10 are made in two different colours similar to the ones of the lenses and the rim in order to camuflage them as much as possible.

Figure 5:
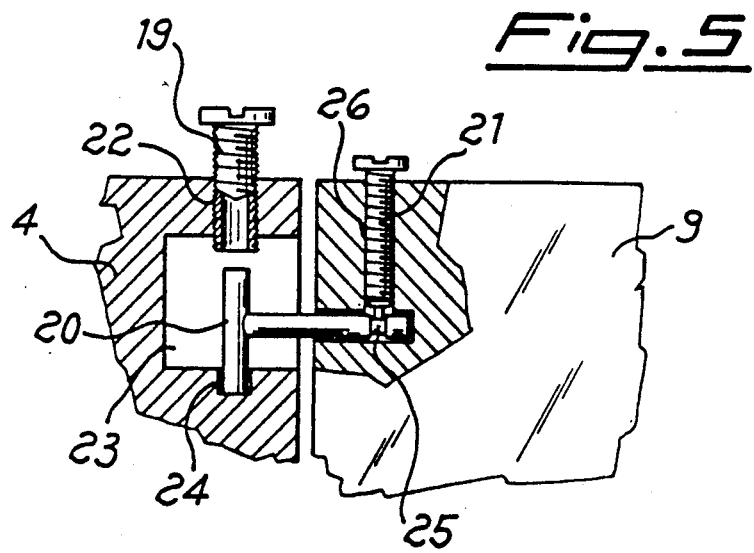
FIG. 5 shows a further alternative of the joint coupling the rear view mirror to the lens and/or rim.

FIG. 5 shows another possible alternative for pivotally coupling the mirror parts 9 and 10 to the rim 4 and/or to the lenses 1 and 2 respectively. This alternative joint arrangement essentially comprises three parts, i.e. an externally threaded bushing 19, a T-shaped shaft 20 and a pointed screw 21. Bushing 19 is screwed into a cylindrical hole 22 inside of rim 4 and/or inside lenses 1 or 2) and protrudes into the cavity 23 below where there is located the T-shaped shaft 20. The head bar of the T-shaped shaft 20 is positioned vertically and has one end housed in a corresponding recess 24 and the opposite end inserted inside the bushing 19 when this is screwed down. With this arrangement the vertically positioned head bar of the shaft 20 is free to rotate inside the bushing 19 allowing in this way the rotation on the horizontal plane of the horizontally positioned stem of the shaft 20, as well as of the mirror part 9 coupled thereto. Close to its end the stem of the T-shaped shaft 20 is provided with a circumferential groove 25 which forms the seat of the point of screw 21 when this is screwed down inside the vertical cylindrical hole 26 of the mirror part 9. With this arrangement the point of screw 21, being rotatably inserted in the groove 25 of the shaft 20, couples the mirror part 9 to the remainder of the rim 4 (and/or of the lenses 1 or 2) allowing anyway the rotation of part 9 around the said stem acting as horizontal axis of rotation.

It goes without saying that any other suitable arrangement can be used for pivotally coupling the portions 9 and 10 to the lenses 1 and 2 respectively. The same applies to the shape of the eyeglasses or sunglasses which can be with plastic rim, with metal rim or in the form of rimless spectacles. Other possible variants or modifications are available to those skilled in the art remaining within the scope of the present invention.

What I claim is:

1. Eyeglasses with integral rear view mirror wherein an external portion of at least one lens is replaced by a rear view mirror part which is pivotally coupled to the lens and has the same shape and dimension of the replaced portion of the lens.

2. Eyeglasses with integral rear view mirror wherein at least one external portion of the rim is replaced by a rear view mirror part which is pivotally coupled to the rim and has the same shape and dimension of the replaced portion of the rim.

3. Eyeglasses according to claim 1, wherein the rear view mirror part is placed over the horizon line of the view of the user.

4. Eyeglasses according to claim 2, wherein the rear view mirror part is placed over the horizon line of the view of the user.

5. Eyeglasses according to any one of claims 1, 3 or 4, wherein the rear view mirror part is pivotally coupled to the lens by means of a ball joint.

6. Eyeglasses according to any one of claims 1, 3 or 4, wherein the rear view mirror part is pivotally coupled to the lens by means of an arrangement comprising a bushing screwed in the lens which rotatable houses the vertically positioned head bar of a T-shaped shaft positioned inside a cavity in the lens, and a pointed screw housed in the mirror part, the said point of the screw being rotatably inserted in a circumferential groove at the free end of the horizontally placed stem of the T-shaped shaft.

7. Eyeglasses according to claim 2, wherein the rear view mirror part is pivotally coupled to the rim by means of a ball joint.

8. Eyeglasses according to claim 3, wherein the rear view mirror parts are pivotally coupled to the lens by means of a ball joint.

9. Eyeglasses according to claim 4, wherein the rear view mirror part is pivotally coupled to the rim by means of a ball joint.

10. Eyeglasses according to claim 2, wherein the rear view mirror part is pivotally coupled to the rim by means of an arrangement comprising a bushing screwed in the rim which rotatably houses the vertically positioned head bar of a T-shaped shaft positioned inside a cavity in the rim and a pointed screw housed in the mirror part, the said point of the screw being rotatably inserted in a circumferential groove at the free end of the horizontally placed stem of the T-shaped shaft.

11. Eyeglasses according to claim 3, wherein the rear view mirror parts are pivotally coupled to the lens by means of an arrangement comprising a bushing screwed in the lens which rotatably houses the vertically positioned head bar of a T-shaped shaft positioned inside a cavity in the lens, and a pointed screw housed in the mirror part, the said point of the screw being rotatably inserted in a circumferential groove at the free end of the horizontally placed stem of the T-shaped shaft.

12. Eyeglasses according to claim 4, wherein the rear view mirror parts are pivotally coupled to the rim by means of an arrangement comprising a bushing screwed in the rim which rotatably houses the vertically positioned head bar of a T-shaped shaft positioned inside a cavity in the rim, and a pointed screw housed in the mirror part, the said point of the screw being rotatably inserted in a circumferential groove at the free end of the horizontally placed stem of the T-shaped shaft.

13. Eyeglasses according to claim 2, wherein the rear view mirror part is pivotally coupled to the rim by means of a ball joint.

14. Eyeglasses according to claim 2, wherein the rear view mirror part is pivotally coupled to the rim by means of an arrangement comprising a bushing screwed in the rim which rotatably houses the vertically positioned head bar of a T-shaped shaft positioned inside the cavity in the rim, and a pointed screw housed in the mirror part, the said point of the screw being rotatably inserted in a circumferential groove at the free end of the horizontally placed stem of the T-shaped shaft.

* * * * *